(12) United States Patent
Levy et al.

(10) Patent No.: US 6,717,757 B1
(45) Date of Patent: Apr. 6, 2004

(54) VARIABLE WRITE FAULT PROTECTION WINDOW

(75) Inventors: Llyod Levy, San Jose, CA (US); Don Brunnet, Pleasanton, CA (US); Xiaokun Chew, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/579,155

(22) Filed: May 25, 2000

(51) Int. Cl.[7] .............................................. G11B 27/36
(52) U.S. Cl. ............................ 360/31; 360/25; 360/46; 360/53; 360/60
(58) Field of Search .......................... 360/31, 25, 53, 360/46, 60

(56) References Cited

U.S. PATENT DOCUMENTS 5,600,500 A * 2/1997 Madsen et al. ............... 360/46
6,249,393 B1 * 6/2001 Billings et al. ............... 360/31
6,405,277 B1 * 6/2002 Jen et al. ....................... 711/4
6,408,406 B1 * 6/2002 Parris ............................ 714/41
6,445,521 B1 * 9/2002 Schaff et al. ................. 360/31

* cited by examiner

Primary Examiner—David Hudspeth
Assistant Examiner—Mitchell Slavitt
(74) Attorney, Agent, or Firm—Tejpal S. Hansra

(57) ABSTRACT

A disk drive utilizes a unique write condition for each of the transducers within the drive. Each write condition is determined based upon the specific properties of the corresponding transducer. The write condition information is preferably stored within a memory within the disk drive. When a write operation is performed, the appropriate write condition for the corresponding transducer is used to determine when to write data to the disk. A write condition will typically include one or more individual write criteria. For example, a write condition can specify a write threshold value to be used during a write operation. Similarly, a write condition can involve a combination of a write threshold and a radial transducer velocity. Other write criteria are also possible.

31 Claims, 4 Drawing Sheets

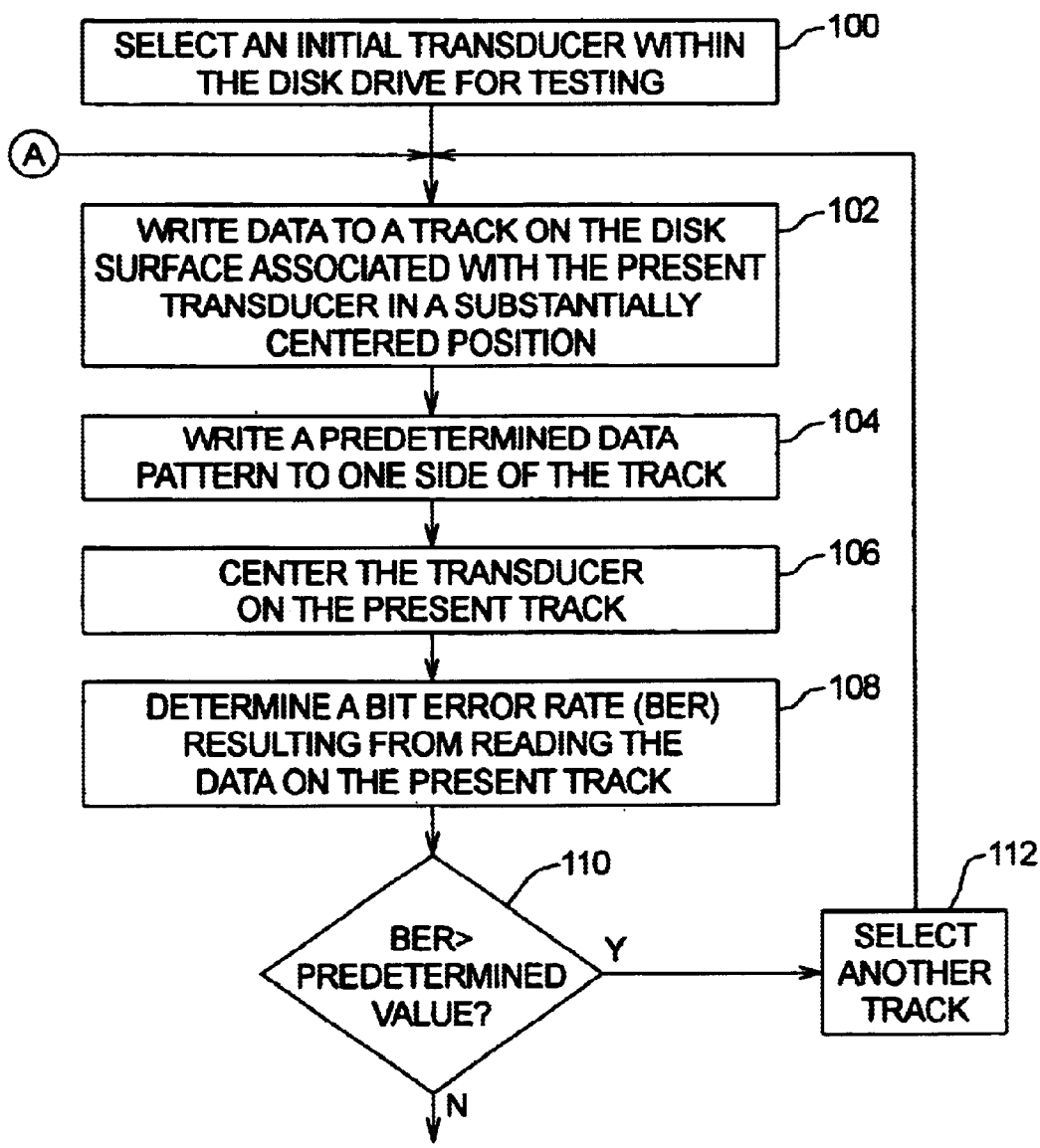

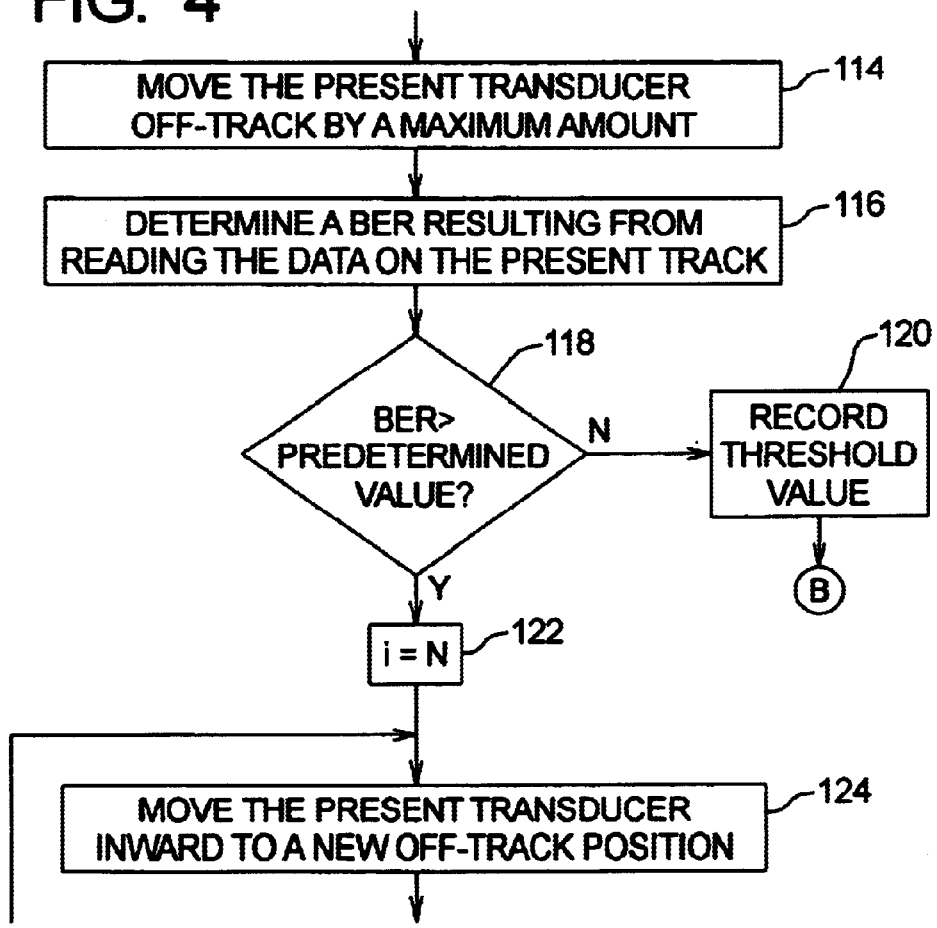

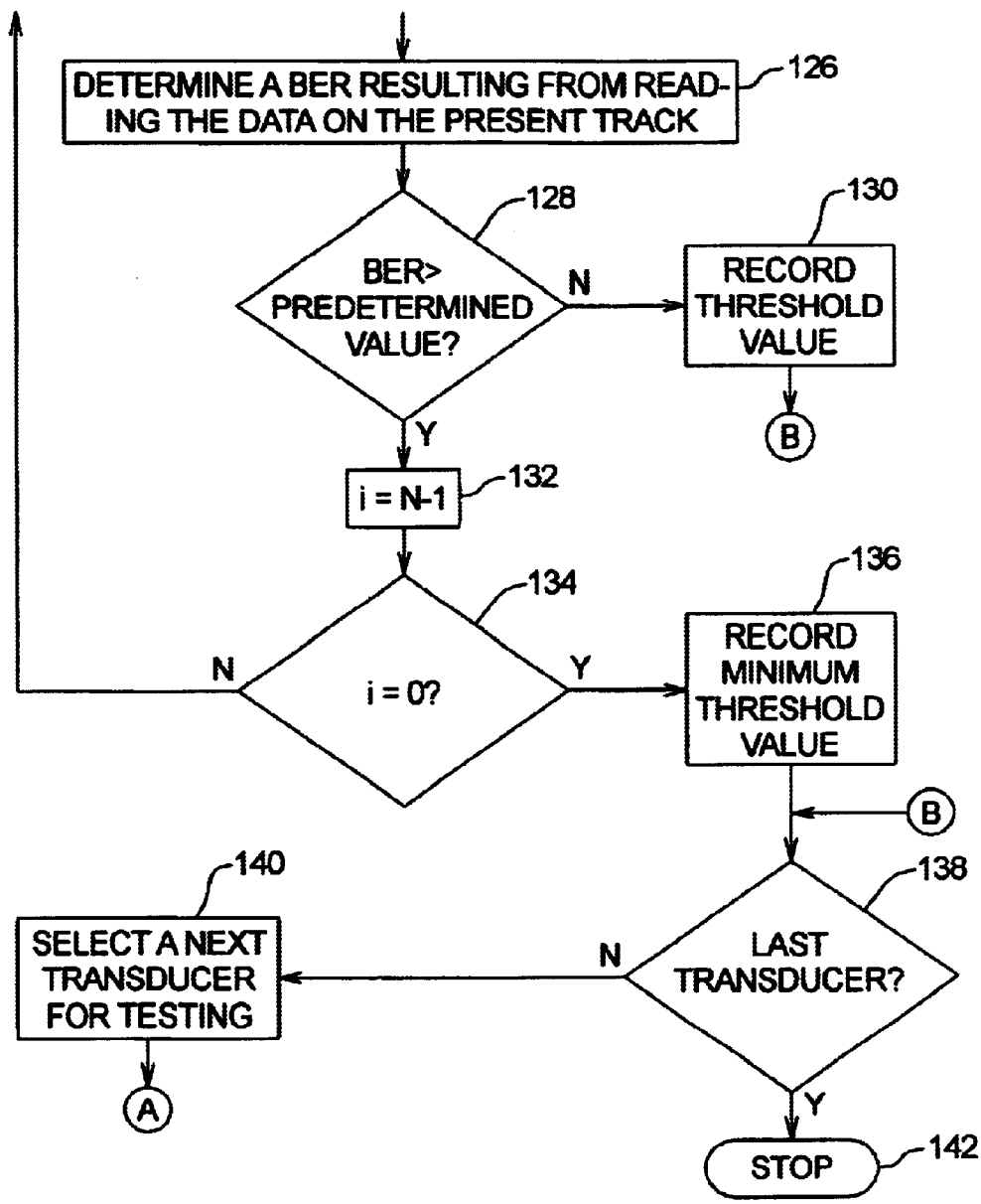

VARIABLE WRITE FAULT PROTECTION WINDOW

FIELD OF THE INVENTION

The invention relates generally to data storage systems and, more particularly, to disk-based data storage systems.

BACKGROUND OF THE INVENTION

A disk drive is a data storage device that stores digital data in substantially concentric tracks on a data storage disk. During disk drive operation, the data storage disk is rotated about an axis while a transducer is used to read and/or write data from/to a target track of the disk. A servo control loop is used to position the transducer above the target track while the data transfer is taking place. The servo control loop uses servo data read from a surface of the data storage disk as position feedback to maintain the transducer in a substantially centered position above the target track during the data transfer. However, because of positioning errors inherent in the disk drive, the transducer does not remain perfectly centered during the entire data transfer but, instead, remains within a positional range about the target track that is dictated by the mechanical properties of the drive.

When a transducer moves off-track during a write operation, there is a chance that the transducer might inadvertently write data on or near an adjacent track, thus corrupting the data written on the adjacent track. In addition, the data that is written off-track by the transducer may be difficult or impossible to read during a subsequent read operation on the present track due to its off-track position. Thus, an off-track threshold is typically defined in a disk drive that indicates an off-track transducer position beyond which write operations will be suspended. If the transducer goes beyond this off-track position during a write operation, the write operation is suspended until the transducer again comes within the specified positional window about the target track.

The off-track threshold has traditionally been determined during disk drive development based upon collected (worst case) off-track capability (OTC) data and estimates of transducer positioning error. A single off-track threshold value was then used for all transducers within all drives in a production run. During disk drive test, if the OTC of the transducers in a particular drive were all within a specified range and the measured position error of the drive was also within a corresponding range, the disk drive would be passed. It would thus be assumed that the off-track threshold programmed into the drive would be sufficient to prevent adjacent track data corruption and unreadable off-track data. If the OTC of a transducer was not within the specified range, the transducer would not be used in a disk drive. Similarly, if a particular drive displayed greater than a predetermined position error, the drive would not be used. As can be appreciated, the greater the number of units that are left unused during the manufacturing process, the greater the overall manufacturing costs.

Therefore, there is need for a method and apparatus that is capable of increasing yields during the disk drive manufacturing process without compromising disk drive performance.

SUMMARY OF THE INVENTION

The present invention relates to a method and apparatus that is capable of increasing yields during the disk drive manufacturing process. Instead of specifying a single off-track threshold value for an entire production run of disk drives, unique off-track threshold values are generated for individual disk drives during the manufacturing process. The off-track threshold values are determined based on the measured off-track capability (OTC) of the transducers actually within each drive as well as the positioning errors associated with each disk drive. Because the off-track threshold values are variable from drive to drive, transducers that were previously discarded as not falling within a predetermined OTC range can now be used as long as they occur in a drive having lower positioning error. Similarly, drives having a large positioning error can be used if paired with transducers having superior OTC. In this manner, manufacturing yields are increased without compromising disk drive performance.

In a preferred embodiment, a separate off-track threshold value is generated for each of the transducers within a manufactured disk drive. In addition, individual threshold values can also be specified as a function of radial position (e.g., on a zone by zone basis) for each transducer. In one approach, a lookup table is provided within the disk drive for storing the off-track threshold values used by the drive. An appropriate value is retrieved from the lookup table for each write operation performed by the disk drive. The off-track threshold values are preferably generated during a test procedure that is part of the manufacturing process. The test procedure is desirably performed after head optimization, channel optimization, and servo calibration procedures have been performed. In a preferred approach, a limited number of possible off-track threshold values are specified for use by the disk drives. By limiting the number of possible off-track threshold values, the off-track threshold determination process is significantly simplified while still achieving the benefits of a variable off-track threshold.

BRIEF DESCRIPTION OF THE DRAWINGS

FIGS. 3–5 are portions of a flowchart illustrating a detailed method for determining off-track threshold values for a disk drive in accordance with one embodiment of the present invention.

DETAILED DESCRIPTION OF A PREFERRED EMBODIMENT

Figure 1:
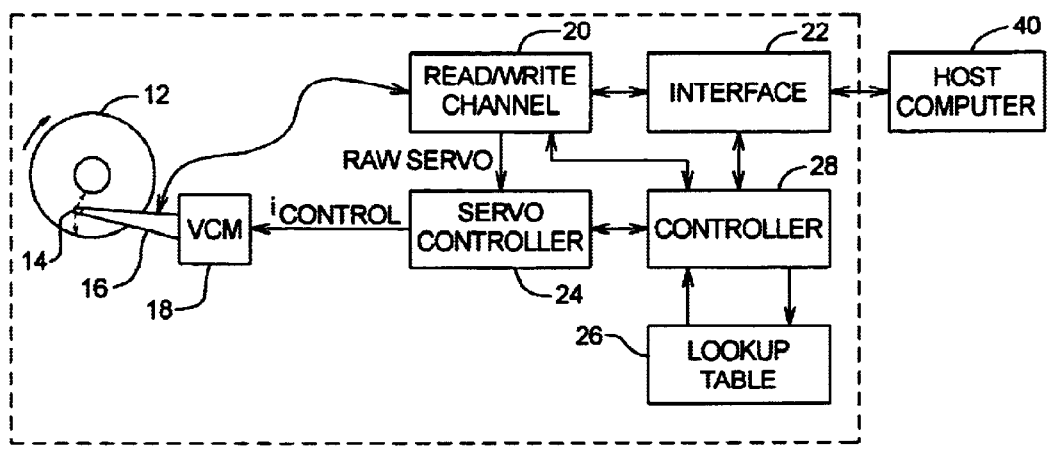
FIG. 1 is a block diagram illustrating a disk drive in accordance with one embodiment of the present invention.

FIG. 1 is a block diagram illustrating a disk drive 10 in accordance with one embodiment of the present invention. As illustrated, the disk drive 10 is coupled to an external host computer 40 that uses the disk drive 10 as a mass storage device. It should be appreciated that the blocks illustrated in FIG. 1 are functional in nature and do not necessarily represent discrete hardware elements. For example, in one approach, two or more of the functional blocks within the disk drive 10 are implemented in software within a common digital processor. With reference to FIG. 1, the disk drive 10 includes: at least one data storage disk 12, at least one transducer 14, an actuator arm assembly 16, a voice coil motor (VCM) 18, a read/write channel 20, an interface unit 22, a servo controller 24, a lookup table 26, and a disk drive controller 28. The disk drive 10 receives read and/or write requests from the host computer 40 and carries out the requests by performing data transfers between the at least one disk 12 and the host 40. In a preferred embodiment, the disk drive 10 includes multiple disks 12 in a vertical stack arrangement with one transducer 14 for each operative disk surface. Typically, both surfaces of each disk 12 will be operative for storing user data and, therefore, the disk drive 10 will include two transducers 14 for each disk 12. Single sided disk arrangements can also be used.

The interface unit 22 is operative for providing an interface between the disk drive 10 and the host computer 40. During read and write operations, the interface unit 22 provides a communications path, including data buffering functions, between the host computer 40 and the read/write channel 20. In addition, the interface unit 22 is operative for receiving commands and requests from the host 40 and directing them to the controller 28. The controller 28 then carries out the commands by appropriately controlling the elements within the disk drive 10.

The voice coil motor (VCM) 18 is operative for controllably positioning the transducers 14 with respect to their corresponding disk surfaces in response to a control signal (e.g., $i_{control}$) generated by the servo controller 24. The transducers 14 are all coupled to a single integrated arm assembly 16 and thus move together under the influence of the VCM 18. When performing a read or write operation, the controller 28 instructs the servo controller 24 to move one of the transducers 14 to a target track on a corresponding disk surface so that a data transfer can take place. The servo controller 24 then generates a control signal to move the identified transducer 14 from a present location to the indicated target track in a process known as a "seek" operation. Once the transducer 14 has arrived at the target track, the servo controller 24 enters a "track follow" mode during which the transducer 14 is maintained in a substantially centered position above the target track. The bulk of the data transfer between the transducer 14 and the target track occurs during this track follow mode.

The read/write channel 20 is operative for, among other things, performing the data transformations necessary to provide communication between the host computer 40 and the disk 12. For example, during a write operation, the read/write channel 20 converts digital data received from the host computer 40 into an analog write current for delivery to one of the transducers 14. During a read operation, the read/write channel 20 provides the data transformations necessary for converting an analog read signal received from one of the transducers 14 into a digital representation that can be recognized by the host computer 40. The read/write channel 20 is also operative for separating out servo information read by one a transducer and for directing this servo information to the servo controller 24 for use in positioning the transducer.

In the illustrated embodiment, the lookup table 26 is operative for storing an individual off-track threshold value for each of the transducers 14 in the disk drive 10. The off-track threshold values are used by the disk drive 10 during write operations to determine when a corresponding transducer is too far off-track to reliably write data to the track. When performing a write operation, the disk drive controller 28 first retrieves an off-track threshold value from the lookup table 26 corresponding to the transducer 14 associated with the write operation. The controller 28 then allows data to be written to the target track only when the corresponding transducer 14 is within a positional window about the target track that is defined by the retrieved off-track threshold value. The disk drive controller 28 monitors the position of the transducer 14 during the write operation to determine whether it is within the window. As long as the transducer 14 is positioned within the window, the write operation is allowed to continue. If the transducer 14 moves outside of the window, the controller 28 suspends performance of the write operation until a future time. Typically, the controller 28 will resume writing data on a next pass of the corresponding portion of the target track as long as the transducer 14 is properly positioned at that time. The controller 28 typically controls the writing of data to the target track using a write enable signal delivered to the read/write channel 20.

In one aspect of the present invention, the lookup table 26 stores multiple off-track threshold values for each of the transducers 14 in the disk drive 10. These off-track threshold values are specified as a function of radial position on the corresponding disk surface. In one approach, for example, a separate value is specified for each zone of a corresponding disk surface. Thus, when data is being written to a target track within a particular zone on a disk surface, an off-track threshold value corresponding to that particular zone is retrieved from the lookup table 26 and used during the write operation.

Figure 2:
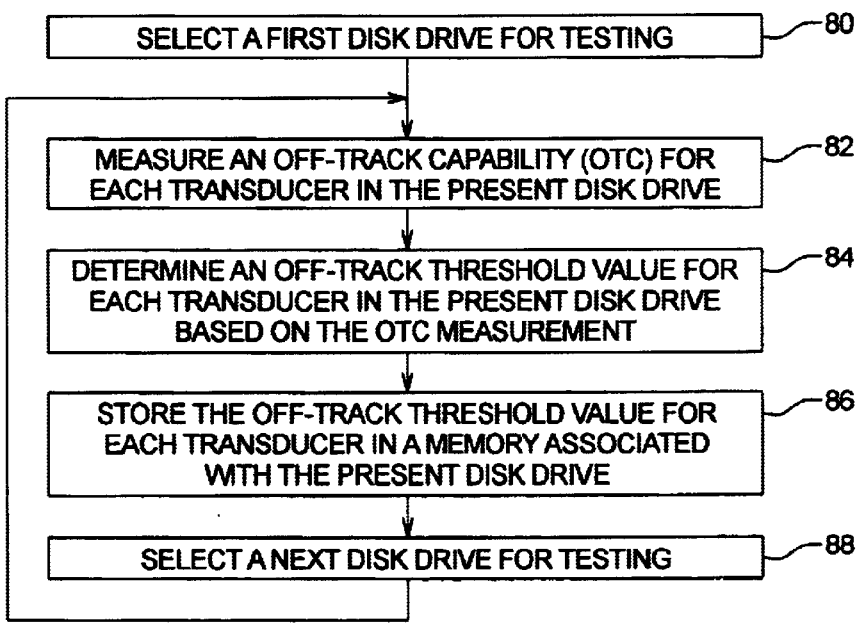
FIG. 2 is a flowchart illustrating a method for generating and storing off-track threshold values during a disk drive manufacturing process in accordance with one embodiment of the present invention.

FIG. 2 is a flowchart illustrating a method for generating and storing off-track threshold values during a disk drive manufacturing process in accordance with one embodiment of the present invention. A first disk drive is initially chosen for testing purposes (step 80). The disk drive is typically chosen from a queue of assembled drives waiting to be tested. An off-track capability (OTC) is then measured for each transducer within the selected disk drive (step 82). The OTC of a transducer is related to the transducer's ability to operate reliably while in an off-track position. Thus, a transducer having better OTC will be able to operate reliably at positions that are further off-track than those of a transducer having a worse OTC. Methods for measuring OTC are known in the art.

Based on the measured OTC information, at least one off-track threshold value is generated for each of the transducers within the disk drive (step 84). In one approach, the off-track threshold for a particular transducer is selected to fall between a worst case OTC for the transducer and a largest measured position error for that particular transducer. To provide more tolerance to head performance, the threshold can be set closer to the largest measured position error. To provide greater operating vibration margin, the threshold can be set closer to the worst case OTC. The generated off-track threshold values are stored in a memory associated with the disk drive for later use during write operations within the drive (step 86). A next disk drive is then selected for testing (step 88) and the method is repeated. The above-described method will preferably be repeated for every disk drive in the production run.

In one embodiment of the invention, a minimum average off-track threshold value is specified for manufactured disk drives. Thus, if the average off-track threshold value in a particular disk drive is less than the specified minimum, the disk drive is rejected. This is because such a disk drive will not generally perform well under operating vibration. The average threshold value test can be implemented, for example, as an additional step in the method illustrated in FIG. 2.

FIGS. 3–5 are portions of a flowchart illustrating a detailed method for determining off-track threshold values for a disk drive in accordance with one embodiment of the present invention. The method is preferably performed during a disk drive testing procedure that is part of the disk drive manufacturing process. The process can also be used, however, to perform periodic re-calibrations in the field. As such, a program can be included within a disk drive that is capable of performing the method to determine new off-track threshold values after the disk drive has been used for a period of time. The method is preferably performed after head optimization, channel optimization, and servo calibration procedures have been performed for the disk drive.

With reference to FIG. 3, an initial transducer is first selected for testing within the disk drive (step 100). Using the selected transducer, a predetermined data pattern is written to a track on the disk surface associated with the transducer (step 102). In a preferred approach, the track that is chosen for performing the off-track threshold determination is a track that has previously been determined to be defect-free and that is located on a portion of the disk surface that is known to experience worst-case positioning errors. A data pattern is then written to at least one side of the selected track (step 104). In one embodiment, the data pattern is written approximately 90% off-track (i.e., the data pattern is nominally centered 90% of a track spacing from the track under test). The data pattern is preferably designed to generate a predictable error response during an off-track read operation subsequently performed on the track.

The selected transducer is next centered on the chosen track (step 106). A read operation is then performed on the chosen track and a resulting bit error rate (BER) is measured (step 108). To get an accurate reading of BER, the data on the chosen track generally has to be read a relatively large number of times. During the BER measurement, the selected transducer will be nominally located on the center of the track. However, because of the positioning error (e.g., repetitive runout and non-repetitive runout) of the disk drive, the transducer will be continually moving off-center during the testing procedure. Because the selected transducer is nominally centered during this portion of the test, the measured BER should be extremely small or zero if the chosen track is truly free of defects. The measured BER is next compared to a predetermined value (step 110). If the measured BER is greater than the predetermined value, the present track is deemed defective and another track on the same disk surface is chosen (step 112). The above procedure is then repeated for the newly chosen track.

If the measured BER is not greater than the predetermined value, the selected transducer is then moved to a maximum off-track position in a direction toward the written data pattern (step 114). In a preferred approach, this maximum off-track position represents a farthest distance from the centered transducer position for which a transducer may be capable of reliably reading data from the track. As before, the transducer will only be nominally located at this maximum off-track position during the test and will be continually moving to either side of this position based on the positioning error of the drive. A read operation is next performed at the maximum off-track position and a resulting bit error rate (BER) is measured (step 116). The measured BER is compared to the predetermined value (step 118) and, if it does not exceed the predetermined value, an off-track threshold value corresponding to the maximum off-track transducer location is recorded for the present transducer (step 120). It is then determined whether the present transducer is the last transducer in the disk drive to be tested (step 138) and, because it is not, a next transducer is selected (step 140) and the method is repeated for the new transducer.

If the measured BER does exceed the predetermined value, it is assumed that the maximum off-track position is too far off-track for this transducer in this disk drive. Thus, one or more intermediate transducer positions between the maximum position and the centered position are now tested. By using a finite number of possible threshold values, the complexity of the test procedure is reduced dramatically while still obtaining the benefits of the variable threshold approach. An index i is initialized to a value of N, where N is an integer representing the number of off-track positions between the maximum off-track position and the centered position that will be tested (step 122). As can be appreciated, the value of N used in a particular implementation will directly affect the average amount of time the off-track threshold determination process requires. The higher the value of N, the greater the gains in manufacturing yield that are possible. However, a higher value of N will require a longer test process which may be unacceptable. In general, a tradeoff between increased yield and test duration needs to be performed.

After the index i has been initialized, the transducer is moved inward a predetermined amount from the maximum off-track location toward the track center (step 124). The data on the track is then read and a resulting BER is measured (step 126). The BER is compared to the predetermined value (step 128) and, if it does not exceed the predetermined value, an off-track threshold value corresponding to the new off-track transducer position is recorded for the present transducer (step 130). It is then determined whether the present transducer is the last transducer in the disk drive to be tested (step 138) and, because it is not, a next transducer is selected (step 140) and the method is repeated for the new transducer.

If the measured BER is greater than the predetermined value, the index i is reduced by 1 (step 132) and compared to a value of zero (step 134). If the index does not equal zero, the method returns to step 124 and the transducer is again moved inward to a new off-track position and the BER is again determined. This process is then repeated until an adequate BER is achieved or the index reaches zero. If the index reaches zero before an adequate BER is achieved, a minimum predetermined off-track threshold value is recorded for the present transducer (step 136). It is then determined whether the present transducer is the last transducer in the disk drive to be tested (step 138) and, because it is not, a next transducer is selected (step 140) and the method is repeated for the new transducer. The above method is continued until all of the transducers within the disk drive have been tested and corresponding off-track threshold values have been recorded (step 142).

The above method can be modified so that off-track threshold values are determined for each off-track direction for each track tested. This will generally require that a data pattern be written to both sides of the track in step 104. The smaller of the two measured values can then be stored in the disk drive for later use. In addition, the method can also be modified so that off-track threshold values are generated for each zone of a corresponding disk surface for each of the transducers within the disk drive. Other modifications can also be made in accordance with the present invention.

In the embodiments described above, unique off-track threshold values are generated for the transducers within a disk drive. These off-track threshold values define a positional range within which a transducer must be during a write operation before data is written to the disk. Many disk drives, however, utilize more than a simple transducer positional criterion to determine when to write data to a disk. For example, some disk drives require a combination of the transducer position and the transducer velocity to be within a predetermined range before data is written to the disk during a write operation. Thus, the "write condition" that needs to be satisfied before data will be written can involve a single criterion or multiple criteria. In one embodiment of the present invention, a disk drive is provided that uses a unique write condition for each transducer within the drive. In addition, a unique write condition can also be specified for each zone on a disk surface corresponding to a particular transducer. Each write condition can include a single write criterion (e.g., off-track threshold) or multiple criteria (e.g., a combination of off-track threshold and transducer velocity). Information related to the write conditions is preferably stored in a memory within the disk drive for use during subsequent write operations. The appropriate condition for a particular write operation (i.e., a particular transducer and/or zone) is then used to determine when data can be written to a target track of the disk.

Although the present invention has been described in conjunction with its preferred embodiments, it is to be understood that modifications and variations may be resorted to without departing from the spirit and scope of the invention as those skilled in the art readily understand. For example, the inventive principles can be used in connection with disk drives having a single write transducer. For example, one or more write conditions can be determined for the transducer within each disk drive in a production run based on the specific transducer within the drive. Different conditions will thus be used by different disk drives. Such modifications and variations are considered to be within the purview and scope of the invention and the appended claims.

What is claimed is:

1. A disk drive comprising:
   at least one data storage disk having a plurality of substantially concentric tracks for storing digital data, said at least one data storage disk having at least two data storage surfaces;
   at least two transducers for use in writing digital data to said at least two data storage surfaces, said at least two transducers including a first transducer corresponding to a first data storage surface and a second transducer corresponding to a second data storage surface;
   an actuator assembly coupled to said at least two transducers for use in controllably positioning said at least two transducers with respect to said at least one data storage disk, said actuator assembly including an actuator arm assembly for supporting said at least two transducers and a voice coil motor for imparting motion to said actuator arm assembly in response to a control signal;
   a servo control unit for generating said control signal for use in positioning said at least two transducers with respect to said at least one data storage disk; and
   a memory for storing write condition information to be used in subsequent write operations for each of said at least two transducers, said write condition information defining a positional range within which a transducer must be located relative to a target track before data can be written to a disk using a corresponding transducer, said memory including a first write condition corresponding to said first transducer and a second write condition corresponding to said second transducer, wherein the first write condition is different from said second write condition.

2. The disk drive, as claimed in claim 1, wherein:
   said first data storage surface includes a plurality of zones, said plurality of zones including a first zone and a second zone, each of said plurality of zones occupying a different radial position range on said first data storage surface; and
   said memory includes multiple write conditions for said first transducer, said multiple write conditions including one write condition corresponding to said first zone and another write condition corresponding to said second zone.

3. The disk drive, as claimed in claim 1, further comprising:
   means for receiving a write request from an exterior environment, said write request requesting a write operation to be performed on a first target track located on said first data storage surface; and
   means for retrieving, in response to said write request, a write condition corresponding to said first transducer from said memory.

4. The disk drive, as claimed in claim 3, further comprising:
   means for suspending data transfer from said first transducer to said target track during performance of said write request when said write condition is not satisfied.

5. The disk drive, as claimed in claim 1, wherein:
   said memory includes a semiconductor memory.

6. The disk drive, as claimed in claim 1, wherein:
   said memory includes a random access memory.

7. The disk drive, as claimed in claim 1, wherein:
   said memory includes a portion of said at least one data storage disk.

8. The disk drive, as claimed in claim 1, wherein:
   said first and second write condition each specify a write threshold value.

9. The disk drive, as claimed in claim 1, wherein:
   said first and second write condition each specify a transducer velocity value.

10. The disk drive, as claimed in claim 1, wherein:
    said first and second write condition each include multiple write criteria.

11. The disk drive, as claimed in claim 1 wherein, once the first and second write conditions have been stored in memory, the first write condition and the second write condition are not modified due to changes in temperature in the disk drive.

12. The disk drive as claimed in claim 1, wherein the first and second write conditions are determined during a disk drive manufacturing process.

13. A method for use in tuning a disk drive, said disk drive including at least one data storage disk, said at least one data storage disk having a first data storage surface and a second data storage surface, said disk drive also including a first transducer for writing digital data to said first data storage surface and a second transducer for writing digital data to said second data storage surface, said method comprising the steps of:
    determining a first off-track capability corresponding to said first transducer and a second off-track capability corresponding to said second transducer;
    generating a first off-track threshold value based on said first off-track capability and a second off-track threshold value based on said second off-track capability, wherein the first off-track threshold value defines a positional range within which said first transducer must be located relative to a first target track before data can be written to said first target track, wherein the second off-track threshold value defines a positional range within which said second transducer must be located relative to a second target track before data can be written to said second target track, and wherein said first off-track threshold value is different from said second off-track threshold value; and storing said first and second off-track threshold values in a memory within the disk drive for use during subsequent write operations in the disk drive, said first off-track threshold value for use during write operations involving said first transducer and said second off-track threshold value for use during write operations involving said second transducer.

14. The method, as claimed in claim 13, further comprising the step of:

determining a separate off-track threshold value for each of a plurality of disk zones on said first data storage surface and said second data storage surface for said first and second transducers.

15. The method, as claimed in claim 13, wherein:

said step of generating includes generating said first off-track threshold value based upon a position error associated with said disk drive.

16. The method, as claimed in claim 13, wherein, once the first and second off-track threshold values have been stored in memory, the first off-track threshold value and the second off-track threshold value are not modified due to changes in temperature in the disk drive.

17. The method as claimed in claim 13, wherein the first off-track threshold value and second off-track threshold value are determined during a disk drive manufacturing process.

18. A method for use in writing data to a data storage disk in a disk drive, comprising the steps of:

receiving a command to write digital data to a first track on a first disk surface within the disk drive;

moving a transducer associated with the first disk surface from a present position to a position above the first track;

retrieving write condition information corresponding to said transducer from a memory associated with the disk drive, said write condition information defining a positional range within which a transducer must be located relative to a target track before data can be written to the first disk surface using said transducer, said memory storing separate write condition information for each of a plurality of transducers within the disk drive, wherein said separate write condition information is different for at least two of said plurality of transducers and wherein said separate write condition information is stored in said memory for subsequent write operations; and writing data to said first track of the first disk surface using said transducer when said write condition associated with said transducer is satisfied within the disk drive.

19. The method, as claimed in claim 18, wherein:

said write condition information corresponding to said transducer includes a write threshold value.

20. The method, as claimed in claim 18, wherein:

said write condition information includes a combination of transducer position and transducer velocity.

21. The method, as claimed in claim 18, wherein:

said memory includes, for a first transducer in said plurality of transducers, separate write condition information for each of a plurality of disk zones.

22. A computer readable medium having program instructions stored thereon for implementing the method of claim 18, when executed in a digital processor.

23. The method, as claimed in claim 18, wherein, once said separate write condition information has been stored in memory, it is not modified due to changes in temperature in the disk drive.

24. The method as claimed in claim 18, wherein said separate write condition information is determined during a disk drive manufacturing process.

25. A method for use in a disk drive manufacturing environment, comprising the steps of:

providing a first disk drive;

testing a first transducer associated with the first disk drive to determine a first write condition for the first transducer, wherein said first write condition defines a positional range within which the first transducer must be located relative to a first target track before data can be written to the first target track;

storing information related to the first write condition in a memory within the first disk drive for use in subsequent write operations in the first disk drive;

providing a second disk drive;

testing a second transducer associated with the second disk drive to determine a second write condition for the second transducer, wherein said second write condition defines a positional range within which the second transducer must be located relative to a second target track before data can be written to the second target track and wherein said second write condition is different from said first write condition; and storing information related to the second write condition in a memory within the second disk drive for use in subsequent write operations in the second disk drive.

26. The method, as claimed in claim 25, wherein:

said first and second write condition each specify a combination of transducer position and transducer velocity.

27. The method, as claimed in claim 25, wherein:

said first and second write condition each include multiple write criteria.

28. The method, as claimed in claim 25, further comprising:

repeating the steps of providing, testing, and storing for other disk drives within a production run of disk drives.

29. The method, as claimed in claim 25, wherein:

said first and second disk drives each include a single transducer.

30. The method, as claimed in claim 25, wherein:

said first and second disk drives each include multiple transducers.

31. The method as claimed in claim 25 wherein, once the first and second write conditions have been stored in memory, the first write condition and the second write condition are not modified due to changes in temperature in the first or second disk drives.

* * * * *